US009641221B2

(12) United States Patent
Blasco Claret et al.

(10) Patent No.: US 9,641,221 B2
(45) Date of Patent: May 2, 2017

(54) ELECTRICAL DEVICE FOR MULTIPLE-SIGNAL INJECTION ONTO MULTIPLE-CONDUCTOR COMMUNICATIONS MEDIUM

(71) Applicant: Marvell Hispania, S.L.U., Valencia (ES)

(72) Inventors: Jorge Vicente Blasco Claret, Valencia (ES); Jose Luis Gonzalez Moreno, Valencia (ES); Jose Maria Vidal Ros, Valencia (ES)

(73) Assignee: MARVELL HISPANIA, S.L., Valencia (ES)

( * ) Notice: Subject to any disclaimer, the term of this patent is extended or adjusted under 35 U.S.C. 154(b) by 365 days.

(21) Appl. No.: 14/230,621

(22) Filed: Mar. 31, 2014

(65) Prior Publication Data

US 2014/0211868 A1 Jul. 31, 2014

Related U.S. Application Data

(63) Continuation of application No. 12/681,506, filed as application No. PCT/ES2008/000611 on Sep. 26, 2008, now Pat. No. 8,686,597.

(30) Foreign Application Priority Data

Oct. 3, 2007 (ES) ................................ 2007025996

(51) Int. Cl.
*H02J 3/24* (2006.01)
*H04B 3/56* (2006.01)
*H04L 25/02* (2006.01)

(52) U.S. Cl.
CPC .......... *H04B 3/56* (2013.01); *H04L 25/0272* (2013.01); *H04L 25/0276* (2013.01)

(58) Field of Classification Search
CPC .... H04L 25/0272; H04L 25/0276; H04B 3/56
(Continued)

(56) References Cited

U.S. PATENT DOCUMENTS 4,383,243 A * 5/1983 Krugel ................ H02J 13/0041 307/3
5,138,287 A 8/1992 Domokos et al.
(Continued)

FOREIGN PATENT DOCUMENTS

EP 2207272 A1 7/2010
WO WO-2005101684 A1 10/2005

OTHER PUBLICATIONS

PCT International Preliminary Report on Patentability for related application PCT/ES2008/000611; Apr. 2010; 5 pages.
(Continued)

*Primary Examiner* — Jared Fureman
*Assistant Examiner* — Duc M Pham

(57) ABSTRACT

An electrical device includes signal ports, transformers, and a differential mode device. The transformers are in communication with the signal ports, respectively. The transformers are configured to receive input signals, respectively, from the signal ports. Each transformer is configured to inject the respective input signal onto a pair of output lines of the transformer. The differential mode device is connected to a first output line of the pair of output lines of a first transformer exclusive of connection to a second output line of the first transformer. The differential mode device is configured to inject a signal from the first output line onto the pair of output lines of a second transformer. Signals from the pair of output lines of the second transformer are injected onto a pair of conductors, respectively, of a communications medium.

20 Claims, 5 Drawing Sheets

(58) Field of Classification Search
USPC .......................................................... 307/102
See application file for complete search history.

(56) References Cited

U.S. PATENT DOCUMENTS

| | | | | |
|---|---|---|---|---|
| 6,492,880 | B1 | 12/2002 | Chiappe et al. | |
| 6,693,803 | B2 * | 2/2004 | Beranger | H04B 3/54 363/21.07 |
| 7,026,952 | B2 * | 4/2006 | Krueger | G01V 11/002 340/855.3 |
| 7,099,678 | B2 | 8/2006 | Vaidyanathan | |
| 2002/0027760 | A1 | 3/2002 | Anthony | |
| 2002/0044401 | A1 | 4/2002 | Anthony et al. | |
| 2002/0186777 | A1 * | 12/2002 | Perino | H04L 5/20 375/257 |
| 2005/0238107 | A1 | 10/2005 | Yamashita et al. | |
| 2007/0268989 | A1 * | 11/2007 | Schwager | H04B 3/30 375/349 |
| 2008/0137759 | A1 | 6/2008 | Cai et al. | |

OTHER PUBLICATIONS

Pang, T.S.; Common-Mode Current Propagation in Power Line Communication Networks Using Multi-Conductor Transmission Line Theory; 2007; 6 pages.
Pang, T.S.; Modeling and Analysis of Common-Mode Current Propogation in Broadband Power-Line Communication Networks; 2007; 9 pages.
Chinese Office Action for related application 200880118810.X; Sep. 27, 2012; 6 pages.
European Search Report for EP Application No. 08836573.9, dated May 25, 2016.

* cited by examiner

ELECTRICAL DEVICE FOR MULTIPLE-SIGNAL INJECTION ONTO MULTIPLE-CONDUCTOR COMMUNICATIONS MEDIUM

CROSS-REFERENCE TO RELATED APPLICATIONS

This application is a continuation of U.S. patent application Ser. No. 12/681,506 (now U.S. Pat. No. 8,686,597), which has a §371 date of Jun. 24, 2010 and is a National Stage of International Application No. PCT/ES2008/000611, filed Sep. 26, 2008, which claims priority to Spanish Application No. P2007025996, filed Oct. 3, 2007. The entire disclosures of the above applications are incorporated herein by reference.

FIELD

The present disclosure relates to a device specially designed for performing voltage multi-injection on multiple conductors such that it becomes easier to implement methods for increasing the quality of the communications.

BACKGROUND

Communications systems need a transmission medium for signals, and the transmission medium is very often made up of multiple conductors. The presence of these multiple conductors can be exploited in order to enhance various features of the communications system, such as the transmission capacity or immunity to noise, among others. One of the ways of exploiting a multi-conductor medium is to use orthogonal modes, for which it is necessary to inject signals in that medium in the right way.

The device of the present disclosure is designed for being able to apply the method specified in Spanish Application No. 200702256 relating to a "Method for increasing the performance of a communications system on a medium made up of multiple conductors." As with this application, the description of the present disclosure uses various conventional concepts which are commented on below. "Mode" is understood to be the injection of voltage or current on a selective combination of conductors, reference plane, or both. Likewise, "orthogonal multi-injection" is defined as being an injection of multiple modes orthogonal to each other. The injection modes are divided into a common mode, differential modes, and pseudo-differential modes. The common mode is that which causes circulation of currents via the reference plane. The differential modes consist of injection by a conductor and collection of the return via the other, while the pseudo-differential modes consist of injection of voltage or current between one or more conductors and return via one or more conductors different from those used for the injection, the number of conductors used in this case being greater than two.

There exists in the state of the art some references with methods intended to increase the performance of a communications system when the medium is a multi-conductor which leave unsolved the problem of carrying out the injection in that medium. The present disclosure solves this shortcoming and focuses on the specific way of carrying out voltage injection on that medium in order to achieve orthogonality among the injections; it therefore solves the stated problem and as a consequence it is not anticipated by the documents existing in the state of the art.

Moreover, the state of the art also contains references on capacitive couplers, which do not anticipate the teachings of the present disclosure. One of these references is European Application No. E05773887, "Capacitive coupling device for data transmission equipment to a phase of an electrical power line." This reference describes a method of capacitive coupling conceived for medium voltage lines where the safety measures are very strict. The coupling needs a ground connection and it also couples the signal in "single-ended" mode, in other words, it injects the signal in a single phase with respect to ground. This does not take away any novelty or inventive level from the present disclosure, since the latter is capable of injecting in differential or pseudo-differential modes or in common mode, carrying out multi-injections of signals on several conductors, including or not the reference plane normally connected to ground.

Another document of the state of the art is the Spanish Publication No. 2204334A1, "Medium voltage equipment with capacitive coupling system." As with the previous reference, the publication describes a method of medium voltage capacitive coupling in order to couple the signal to a phase of the medium voltage network. This does not affect the novelty or inventive level of the present disclosure, since the publication cannot be used for multiple injections in a multi-conductor medium with reference plane, where the injections are differential, pseudo-differential, or common mode.

U.S. Pat. No. 4,383,243, "Powerline carrier control installation," describes how to couple a signal from a single control tone on the electric line by means of capacitive coupling. The circuit of this patent improves adaptation to the impedance of the medium but cannot be used for multi-injection and so does not take away any novelty or inventive level from the present disclosure.

U.S. Pat. No. 6,693,803, "Coupling device for low-rate carrier current transmission system," reveals a method of coupling for carrying out transmissions/receptions of modulations of a single carrier. The coupling is carried out using a transformer and a coupling capacitor, being a differential injection made between phase and neutral. This circuit cannot be used for carrying out orthogonal multi-injections in multiple conductors, and it therefore does not anticipate the present disclosure.

Finally, another example of a capacitive coupler of the state of the art is U.S. Publication No. 2004/0056734, "Medium voltage signal coupling structure for last leg power grid high-speed data network," which describes a coupler for medium voltage aerial lines, placing the emphasis on the safety mechanisms necessary for the handling of this type of line. As with the previous references, this coupler does not anticipate the multi-injection device of the present disclosure.

SUMMARY

As stated in the title of this specification, the following disclosure relates to a device for voltage multi-injection on multiple conductors. In any communications system, one aims to exploit as much as possible the characteristics of a communications medium in order to achieve the maximum transmission capacity, reliability, coverage, etc. In the case of the communications medium being made up of multiple conductors it is possible to use those conductors in order to achieve one or several of these objectives. There exist methods in the state of the art both for enhancing the quality of the communication and for increasing the reutilization of frequencies, among other applications; however, they need the signals to be injected properly in order to be able to do this.

In order to achieve the objectives and avoid the drawbacks stated in previous sections, the present disclosure includes a device for voltage multi-injection on multiple conductors which permits the application of methods for increasing the performance of a communications system on a medium made up of N conductors and a reference plane. The device is made up of the following elements and connections: E signal inputs, where E is between 1 and N, for each one of the signals to inject between the conductors; E signal transformers which receive the E signal inputs in order to inject them by means of orthogonal modes between the different conductors; and C differential mode chokes, where C lies between 0 and E depending on the number of non-differential modes injected in the E inputs. Thanks to this configuration of the device, it is possible to inject communication signals in up to N combinations of the conductors, including injection in common mode, in such a way that the injected signals are orthogonal to each other.

Moreover, the device can also include A conditioners, where A is between E+1 and N, depending on the number of conductors used, which are located between the conductors and selectively between one of the ends of the secondary winding of the transformers, one of the outputs of the differential mode choke, and both.

In this device the transformers, which have an input winding and an output winding, connect their input winding to the E signal inputs and they connect the ends of their output winding selectively to two conditioners, to one conditioner and a differential mode choke, to two differential mode chokes, or to the reference plane and a differential mode choke.

In general, the differential mode chokes have one input and two outputs. These differential mode chokes connect their input to an element selected from between the ends of the secondary windings of one of the E transformers and one of the outputs of the other differential choke; and they connect their outputs to an element selected from between the input of two different differential chokes, the input of a differential choke and a conditioner of a conductor, and to the input of the signal conditioners of two different conductors; where the injections that use these differential chokes are those known as pseudo-differential injections, injection in common mode or both.

Moreover, if it is wished to permit the co-existence of multi-injected signals with other signals present in the communication medium, the conditioners will be filters.

A specific embodiment of these filters would be to use capacitors as conditioners, which would act as high pass filters towards signals from the communications channel.

The differential mode chokes can be implemented by exploiting the existence of transformers in the device. In this case, one or more of the differential mode chokes are implemented including them in one or more of the E input transformers respectively; such that for each differential mode choke implemented in this way, its input will be the intermediate connection of the secondary winding of the transformer and its outputs will be the ends of the secondary winding.

Finally, although the present disclosure can be used in any multi-conductor medium, it is specifically developed for the case in which the communications channel made up of multiple conductors is the electrical network.

Below, in order to facilitate a better understanding of this descriptive specification and forming an integral part thereof, some figures are attached in which the object of the present disclosure has been represented by way of illustration and non-limiting example.

DESCRIPTION

Given below is a description of various examples, with reference to the numbering adopted in the figures.

Theoretically, it is possible to use the property that the transmission medium is made up of multiple conductors in order to successfully maximize the performance of a communications system using that transmission medium. In fact, it is possible to achieve a method that distributes the voltages in a multi-conductor medium in such a way that the signals are injected orthogonally into that medium, with which a lower level of interference among injections, greater coverage, etc., are achieved.

The main problem of these methods is the injection of the signals in the multi-conductor medium. The present disclosure is capable of carrying out that injection in voltage optimally in order to follow the desired method for increasing the communication capacities of a system which uses that multi-conductor medium.

Figure 1:
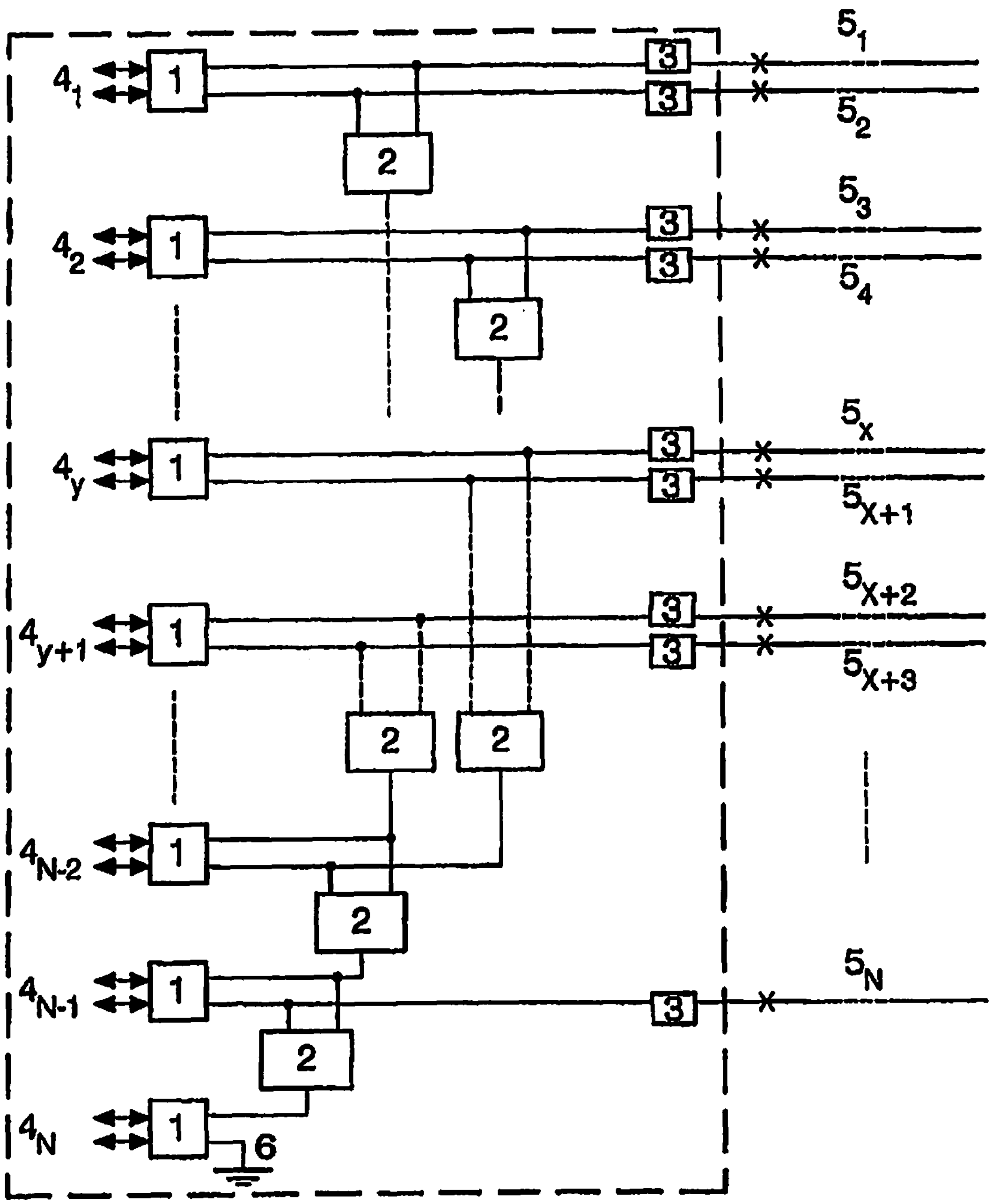
FIG. 1 shows an example of the multi-injection device with N signals on N conductors with their different elements and connections.

FIG. 1 shows an example of a multi-injection device in voltage on N conductors ($5_1$ to $5_N$) and in which their elements and connections can be seen. In this figure, N input signals ($4_1$ to $4_N$) are connected to transformers (1). Depending on the mode to use for injecting the signal, the output from the transformers (1) can be connected to conditioners (3), to differential mode chokes (2), or to both. Although in this example all the signals are used, it is possible to inject fewer than N signals (4), where the number of injections would be less than N. It is even possible not to use all the conductors (5) for injecting, where all that would be needed is as many conditioners (3) as there are conductors (5) on which signals are going to be injected.

Likewise, in this example shown in FIG. 1, the last signal source ($4_N$) is injected in common mode, for which the connection of the secondary winding of the transformer (1) of the signal N is connected at one of its ends to the reference plane (6).

The specific configuration of the transformers (1), differential mode chokes (2) and conditioners (3) will depend on the specific application of the present disclosure, and mainly on the multi-conductor transmission medium used.

Figure 2:
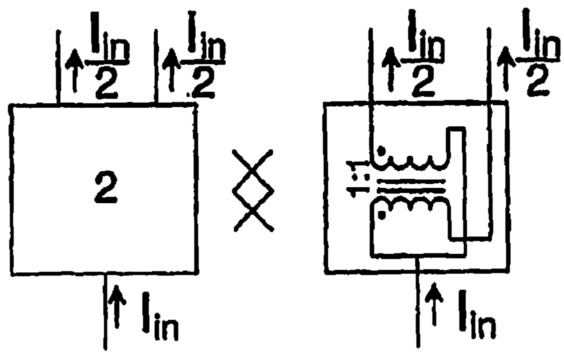
FIG. 2 represents a first form of implementing the differential mode choke of the device.

There exist several ways of implementing the differential mode choke: either separately or including it in a transformer. FIG. 2 shows a way of implementing a differential mode choke (2) separately by means of a transformer with a transformation ratio of 1:1. The choke blocks the differential mode which could enter through its outputs and allows the common mode of its input current ($I_{in}$) to pass to its two outputs, dividing the input current into half for each of the outputs ($I_{in/2}$).

Figure 3:
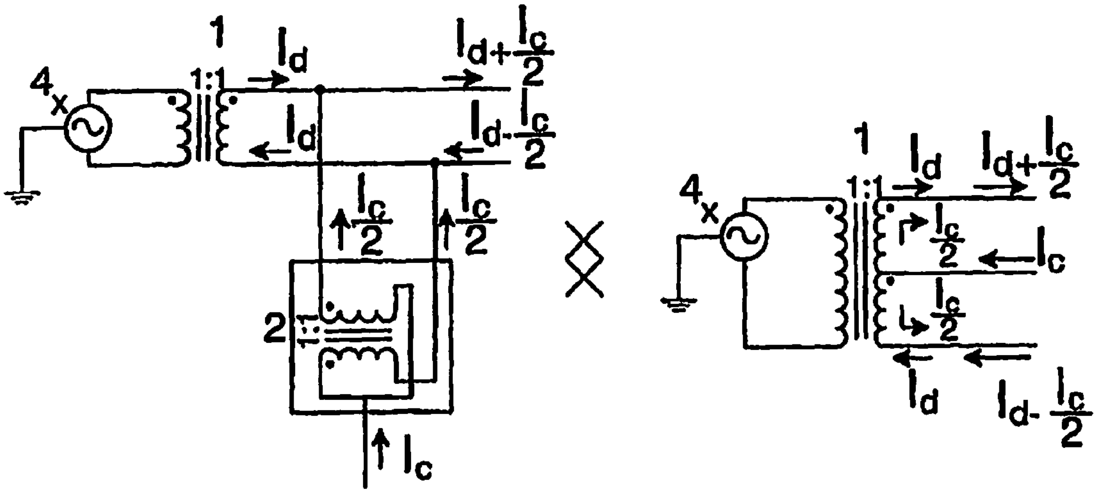
FIG. 3 represents a second form of implementing the differential mode choke, including it in the input transformer.

Moreover, FIG. 3 shows another way of implementing a differential choke (2) by including the differential choke (2) in the input transformer (1). To achieve this, the intermediate connection of the secondary winding of the transformer (1) is used. In order to check the equivalence between the currents, the differential mode currents ($I_d$) and the common mode currents ($I_c$) are indicated separately.

Figure 4:
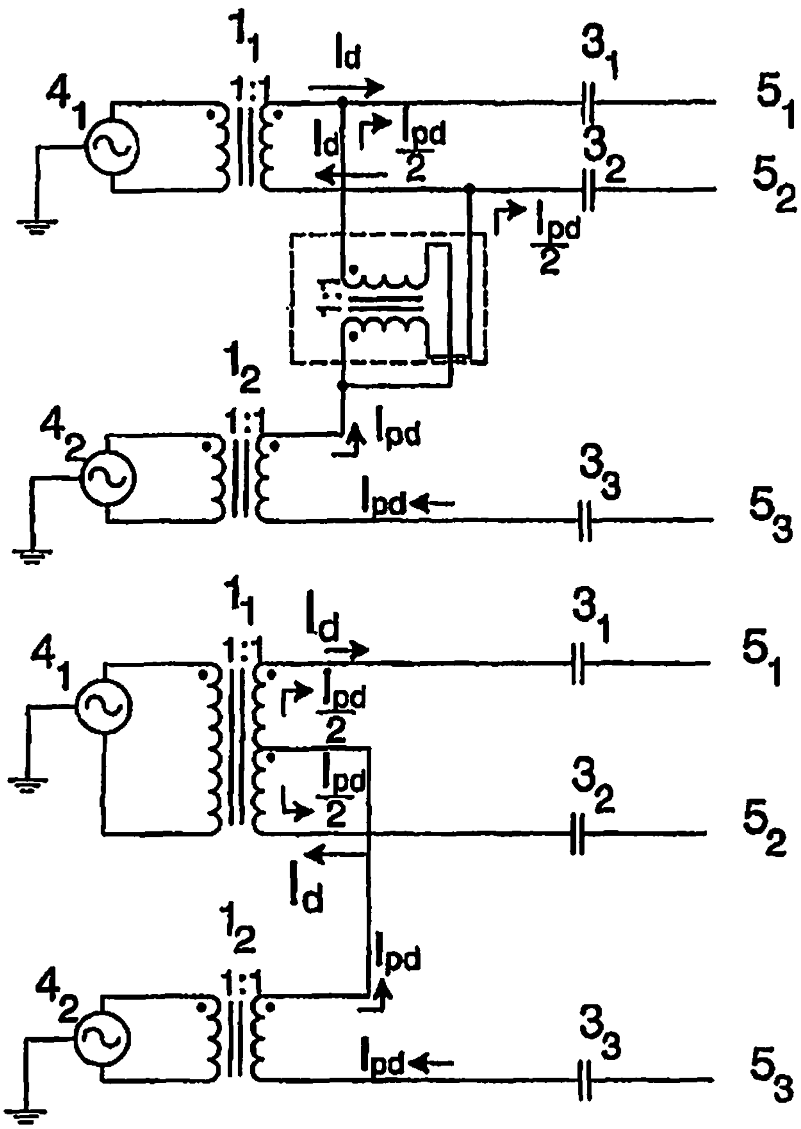
FIG. 4 shows the equivalence of both forms of implementing the differential mode choke of FIGS. 2 and 3, in accordance with the distribution of currents in the injection.

Both ways of embodying the differential choke are equivalent in any implementation of the present disclosure. Shown in FIG. 4 is an example in which there are two signal inputs ($4_1$ and $4_2$), which are differential inputs; there is a transformer for each input ($1_1$ and $1_2$), the medium is made up of three conductors ($5_1$, $5_2$, and $5_3$), and couplers ($3_1$, $3_2$, and $3_3$) associated with each of the conductors (5) are simple capacitors. The upper part of FIG. 4 shows the embodiment with a differential choke (2) separated from the transformer ($1_1$) in order to carry out the multi-injection of the signals, while the lower part of FIG. 4 shows the embodiment with the differential choke included in the transformer of the first input signal ($1_1$) in accordance with that represented in FIG. 3. The comparison of both cases enables it to be confirmed that the distribution of signals is equivalent after the injection has been carried out. In this example, the differential currents ($I_d$) are indicated as are the pseudo-differential currents ($I_N$).

Figure 5:
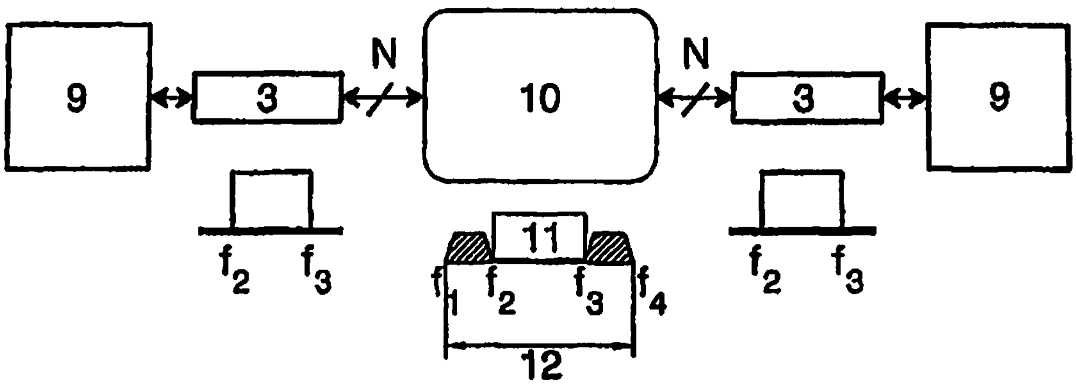
FIG. 5 represents an example in which the conditioners are band pass filters for suitably coexisting with signals of the channel.

The conditioners used in the present disclosure can be implemented, among other ways, as generic filters or as capacitors (acting as high pass filters). Thanks to this, it is possible to coexist with signals pre-existing in the communication medium without interference. In FIG. 5, a communication medium (10) has a defined bandwidth (12) from $f_1$ to $f_4$ but just part of this is free (11) since other signals occupy the spectrum from $f_1$ to $f_2$ and from $f_3$ to $f_4$. This part of the spectrum will be filtered by the conditioners in the circuit of the present disclosure. In this figure part of the device (9) prior to the conditioner is connected to the conditioner (3), which consists of a band pass filter between the frequencies $f_2$ and $f_3$, which coincide with the ends of the free spectrum in the channel (11), permitting injection without interference with the prior signals of the channel.

Figure 6:
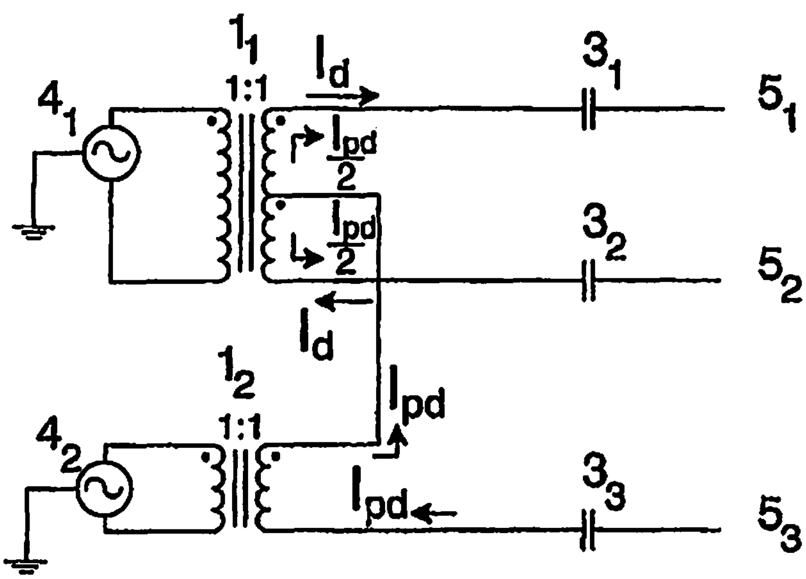
FIG. 6 shows the device for the specific case of injection of an electric network with phase, ground, and neutral.

The present disclosure can be used in any multi-conductor medium, for example the electrical network. This specific embodiment on the electrical network is shown in FIG. 6 where there are three conductors corresponding to phase ($5_1$), neutral ($5_2$), and ground ($5_3$), where the ground conductor ($5_3$) is connected to the reference plane at an electrically remote point for the frequencies used in the communication; therefore, the ground conductor ($5_3$) is considered as a different conductor to the reference plane. In one example of FIG. 6, the transformer of the first input ($1_1$) with intermediate connection in the secondary is a VAC K24940, the transformer of the second input ($1_2$) is a Pulse PE68629, and the conditioners ($3_1$ and $3_2$) consist of coupling capacitors Murata DE1E3KX472MA5B 4N7, X1Y1, 20%. In this way, the capacitors ($3_1$ and $3_2$) block the 50/60 Hz signal of the electric network and it is possible to carry out two orthogonal injections, one of differential mode (signal $4_1$) between phase and neutral and the other of pseudo-differential mode (signal $4_2$) between phase-neutral and ground.

Figure 7:
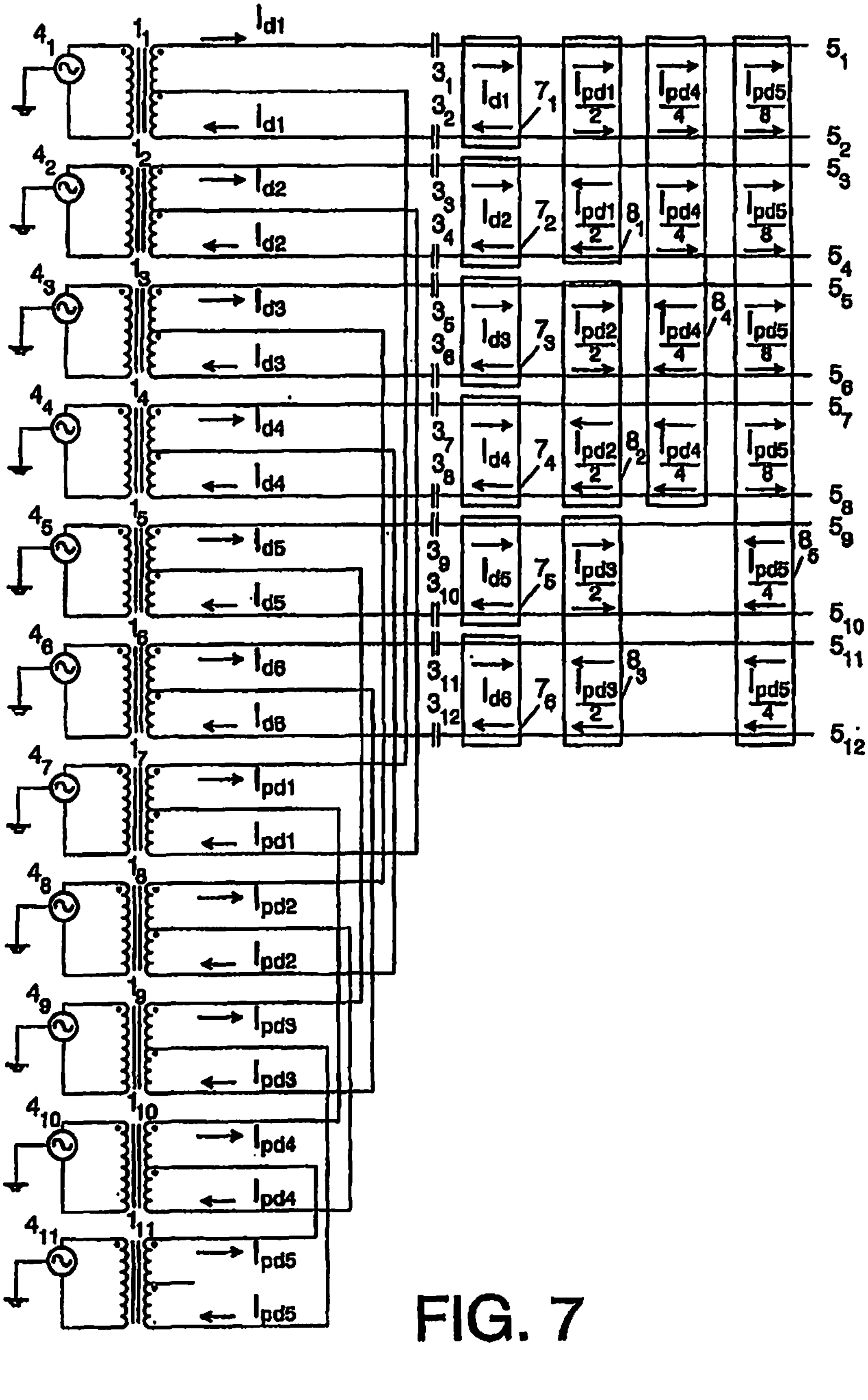
FIG. 7 shows the device for the case of having twelve conductors and using just differential and pseudo-differential injections among them.

The device can be used for any number of conductors. A specific example of an embodiment with twelve conductors in shown in FIG. 7. In this example, injections are carried out solely in differential and pseudo-differential mode (marking the differentials as $7_1$ to $7_6$ and the pseudo-differentials as $8_1$ to $8_5$), and therefore there are just eleven signal inputs. The eleven inputs ($4_1$ to $4_{11}$) are connected to their transformers ($1_1$ to $1_1$) and these in turn are connected to other transformers (1) or to the conditioners (3) in an appropriate manner for ensuring the orthogonality of the injections according to the method for increasing the performance of the communications system that is used. As shown in other embodiments, each one of the conductors ($5_1$ to $5_{12}$) will have an associated conditioner ($3_1$ to $3_{12}$) in order to inject signals into that specific conductor.

What is claimed is:

1. An electrical device comprising:

a plurality of signal ports;

a plurality of transformers in communication with the plurality of signal ports, respectively, wherein the plurality of transformers is configured to receive a plurality of input signals, respectively, from the plurality of signal ports, and each transformer of the plurality of transformers is configured to inject the respective input signal onto a pair of output lines of the transformer; and a differential mode device, wherein the differential mode device is connected to a first output line of the pair of output lines of a first transformer of the plurality of transformers exclusive of connection to a second output line of the pair of output lines of the first transformer, wherein the differential mode device is configured to inject a signal from the first output line onto the pair of output lines of a second transformer of the plurality of transformers, and wherein signals from the pair of output lines of the second transformer are injected onto a pair of conductors, respectively, of a communications medium.

2. The electrical device of claim 1, wherein the differential mode device is configured to:

inject half of the signal from the first output line of the first transformer onto a first output line of the pair of output lines of the second transformer; and inject half of the signal from the first output line of the first transformer onto a second output line of the pair of output lines of the second transformer.

3. The electrical device of claim 2, further comprising:

a first conditioner configured to inject a signal from the first output line of the second transformer onto a first conductor of the pair of conductors; and a second conditioner configured to inject a signal from the second output line of the second transformer onto a second conductor of the pair of conductors.

4. The electrical device of claim 3, wherein:

the first conditioner comprises a first series-connected capacitor; and the second conditioner comprises a second series-connected capacitor.

5. The electrical device of claim 1, further comprising a second differential mode device configured to inject a signal from the second output line of the pair of output lines of the first transformer onto the pair of output lines of a third transformer of the plurality of transformers.

6. The electrical device of claim 1, wherein the second output line of the pair of output lines of the first transformer is connected to a reference plane of the communications medium.

7. The electrical device of claim 1, wherein the second output line of the pair of output lines of the first transformer is injected onto a third conductor of the communications medium.

8. The electrical device of claim 1, wherein the differential mode device comprises a differential mode choke.

9. The electrical device of claim 8, wherein the differential mode choke comprises a transformer.

10. The electrical device of claim 9, wherein:

the transformer of the differential mode device comprises a first winding and a second winding;

a first end of the first winding is in communication with the first output line of the first transformer;

a second end of the second winding is in communication with the first output line of the first transformer;

a first end of the second winding is in communication with a second output line of the pair of output lines of the second transformer; and a second end of the first winding is in communication with a first output line of the pair of output lines of the second transformer.

11. The electrical device of claim 10, wherein the transformer of the differential mode device has a turns ratio of 1:1.

12. The electrical device of claim 1, further comprising an injection device that includes the second transformer and the differential mode device.

13. The electrical device of claim 12, wherein the injection device is configured to:

inject half of the signal from the first output line of the first transformer onto a first output line of the pair of output lines of the second transformer; and inject half of the signal from the first output line of the first transformer onto a second output line of the pair of output lines of the second transformer.

14. The electrical device of claim 12, wherein:

the injection device comprises a center-tapped transformer; and the center-tapped transformer comprises (i) a primary winding and (ii) a secondary winding including a center tap.

15. The electrical device of claim 14, wherein:

the center tap is in communication with the first output line of the first transformer;

first and second ends of the primary winding are in communication with the signal port corresponding to the second transformer; and first and second ends of the secondary winding are in communication with the pair of output lines, respectively, of the second transformer.

16. The electrical device of claim 1, further comprising:

a second differential mode device configured to inject a signal from the first output line of the second transformer onto the pair of output lines of a third transformer of the plurality of transformers; and a third differential mode device configured to inject a signal from the second output line of the second transformer onto the pair of output lines of a fourth transformer of the plurality of transformers.

17. The electrical device of claim 1, wherein the second transformer is configured to inject signals from the pair of conductors onto the signal port corresponding to the second transformer.

18. The electrical device of claim 1, wherein each transformer of the plurality of transformers comprises (i) a first winding in communication with the respective signal port corresponding to the transformer and (ii) a second winding in communication with the pair of output lines of the transformer.

19. The electrical device of claim 1, wherein:

the communications medium comprises a plurality of conductors including the pair of conductors; and a total number of the plurality of signal ports is less than a total number of the plurality of conductors.

20. The electrical device of claim 1, wherein the communications medium comprises a plurality of conductors including the pair of conductors, the electrical device further comprising:

a plurality of conditioners in one-to-one correspondence with the plurality of conductors, wherein each conditioner of the plurality of conditioners is in communication between the corresponding conductor of the conditioner and a respective line of the pairs of output lines of the plurality of transformers.

* * * * *